(12) United States Patent
Morganson

(10) Patent No.: US 11,623,279 B2
(45) Date of Patent: Apr. 11, 2023

(54) RECOATERS WITH GAS FLOW MANAGEMENT

(71) Applicant: Hamilton Sundstrand Corporation, Charlotte, NC (US)

(72) Inventor: David W. Morganson, East Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 530 days.

(21) Appl. No.: 16/429,490

(22) Filed: Jun. 3, 2019

(65) Prior Publication Data

US 2020/0376551 A1 Dec. 3, 2020

(51) Int. Cl.
| | | |
|---|---|---|
| *B22F 10/20* | (2021.01) | |
| *B23K 26/142* | (2014.01) | |
| *B22F 10/28* | (2021.01) | |
| *B22F 10/73* | (2021.01) | |
| *B22F 12/60* | (2021.01) | |
| *B22F 12/50* | (2021.01) | |
| *B23K 26/14* | (2014.01) | |
| *B33Y 10/00* | (2015.01) | |
| *B33Y 30/00* | (2015.01) | |
| *B33Y 40/00* | (2020.01) | |

(52) U.S. Cl.
CPC ............. *B22F 10/20* (2021.01); *B22F 10/28* (2021.01); *B22F 10/73* (2021.01); *B22F 12/50* (2021.01); *B22F 12/60* (2021.01); *B23K 26/14* (2013.01); *B23K 26/142* (2015.10); *B33Y 10/00* (2014.12); *B33Y 30/00* (2014.12); *B33Y 40/00* (2014.12)

(58) Field of Classification Search
CPC .... B23K 15/086; B23K 26/14; B23K 26/142; B28B 1/001; B22F 2003/1057; B22F 10/10; B22F 10/20; B22F 10/28; B22F 10/30; B22F 10/70; B22F 10/73; B22F 12/00; B22F 12/50; B22F 12/60; B29C 64/153; B29C 64/214; B29C 64/357; B33Y 10/00; B33Y 30/00; B33Y 40/00
See application file for complete search history.

(56) References Cited

U.S. PATENT DOCUMENTS

| | | | |
|---|---|---|---|
| 7,045,738 B1 | 5/2006 | Kovacevic et al. | |
| 10,016,852 B2 | 7/2018 | Broda | |
| 2002/0152002 A1* | 10/2002 | Lindemann | B29C 64/153 700/119 |
| 2006/0214335 A1* | 9/2006 | Cox | B01F 5/10 264/497 |
| 2015/0367573 A1* | 12/2015 | Okazaki | B29C 64/153 425/174.4 |
| 2016/0136731 A1 | 5/2016 | Mcmurtry et al. | |

(Continued)

OTHER PUBLICATIONS

Extended European Search Report dated May 15, 2020, issued during the prosecution of European Patent Application No. EP 19212896.5.

*Primary Examiner* — Nicholas A Wang
(74) *Attorney, Agent, or Firm* — Locke Lord LLP; Joshua L. Jones; Scott D. Wofsy

(57) ABSTRACT

An additive manufacturing device includes a recoater configured to push powder onto a build platform. The recoater defines an advancing direction for pushing powder. A gas mover is mounted to the recoater and is configured to flow gas to remove powder from the build platform as the recoater moves along the advancing direction.

11 Claims, 4 Drawing Sheets

(56) References Cited

U.S. PATENT DOCUMENTS

| | | | | |
|---|---|---|---|---|
| 2016/0368052 A1* | 12/2016 | Jaki | .................... | B29C 64/214 |
| 2017/0120538 A1 | 5/2017 | DeMuth et al. | | |
| 2018/0133967 A1* | 5/2018 | Bechmann | ............ | B29C 64/371 |
| 2018/0186073 A1 | 7/2018 | Dial et al. | | |
| 2018/0207721 A1* | 7/2018 | Schlick | .................. | B22F 5/009 |
| 2018/0345372 A1 | 12/2018 | Corsmeier | | |
| 2018/0370213 A1* | 12/2018 | Gold | ..................... | B29C 64/321 |

\* cited by examiner

RECOATERS WITH GAS FLOW MANAGEMENT

BACKGROUND

1. Technological Field

The present disclosure relates to additive manufacturing, and more particularly to powder bed fusion additive manufacturing machines.

2. Description of Related Art

Powder bed fusion additive manufacturing can benefit from flowing a laminar flow of inert gas over the build in progress, e.g. to help control material properties in metal being sintered in the build, to remove impurities and vaporized metal resulting from the melt process, and to keep laser optics clean. Traditional recoaters tend to push powder laid at each new layer of the build. As a recoater repeatedly plows powder from the build area, banks of powder can build up on either side of the recoater's path over the build area. If left unchecked, the banks can disrupt the laminar flow of inert gas so that it does not effectively bathe the build area, which can be detrimental to build quality and laser optics.

The conventional techniques have been considered satisfactory for their intended purpose. However, there is an ever present need for improved recoaters. This disclosure provides a solution for this need.

SUMMARY OF THE INVENTION

An additive manufacturing device includes a recoater configured to push powder onto a build platform. The recoater defines an advancing direction for pushing powder. A gas mover is mounted to the recoater and is configured to flow gas to remove powder from the build platform as the recoater moves along the advancing direction.

A build platform can be mounted stationary relative to advancing and returning movement of the recoater over the build platform. A gas inlet for inert gas can be included on a lateral side of the build platform. A gas outlet for inert gas can be included on a lateral side of the build platform opposite the inlet. A powder drain can be included at one end of the build platform, for removal of power from the build platform to prevent buildup of lateral powder banks blocking flow of inert gas from the gas inlet to the gas outlet. A second powder drain can be included at an end of the build platform opposite the first powder drain, configured remove powder from the build platform to prevent buildup of lateral powder banks blocking flow of inert gas from the gas inlet to the gas outlet.

The gas mover can include a vacuum with a vacuum inlet mounted to the recoater. The vacuum inlet can be mounted to the leading edge of the recoater and can face forward relative to the advancing direction. A vacuum hose can fluidly connect between the vacuum inlet and a vacuum source. It is also contemplated that the gas mover can include a blower with a blower outlet mounted to the recoater. The blower outlet can be mounted to the leading edge of the recoater and can face forward relative to the advancing direction. A blower hose can be included fluidly connecting between the blower outlet and a compressed gas source. The gas mover can include a vacuum in fluid communication with a vacuum inlet mounted to the recoater, and a compressed gas source in fluid communication with a blower outlet mounted to the recoater.

A method of additive manufacturing includes advancing a recoater over a build area to push powder across the build area. The method includes moving a gas mover to remove excess powder from the build area to prevent a buildup of powder banks in the build area. The method includes selectively fusing powder in the build area.

The method can include bathing the build area in a laminar flow of inert gas while selectively fusing the powder in the build area, and repeating advancing the recoater, selectively fusing powder, and bathing the build area in a laminar flow of inert gas without building up a bank of powder along the build area to block the laminar flow of inert gas. Using a gas mover can include vacuuming the excess powder with a vacuum inlet. The method can include filtering and recycling the excess powder for use in the build area. Moving a gas mover can include blowing the excess powder toward a drain. Moving a gas mover can include using the gas mover as the recoater advances across the build area. Moving a gas mover can includes using the gas mover as the recoater returns from advancing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
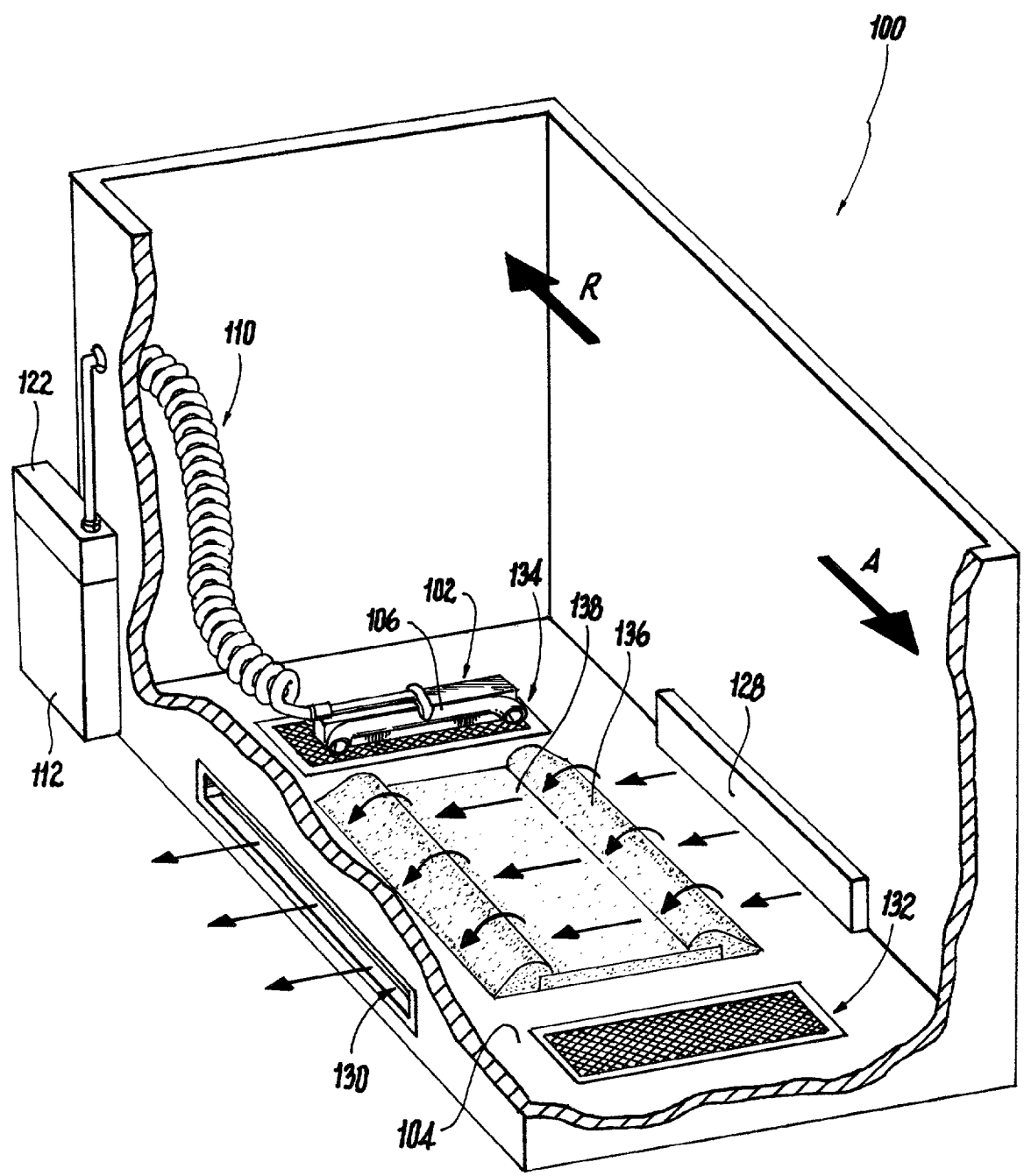
FIG. 1 is a schematic perspective view of an exemplary embodiment of a device constructed in accordance with the present disclosure, showing the recoater in a starting position.

Reference will now be made to the drawings wherein like reference numerals identify similar structural features or aspects of the subject disclosure. For purposes of explanation and illustration, and not limitation, a partial view of an exemplary embodiment of the an additive manufacturing device in accordance with the disclosure is shown in FIG. 1 and is designated generally by reference character 100. Other embodiments of additive manufacturing devices in accordance with the disclosure, or aspects thereof, are provided in FIGS. 2-4, as will be described. The systems and methods described herein can be used to prevent powder buildup banks lateral to the build area disrupting laminar flow of inert gas over the build area during sintering in additive manufacturing.

The additive manufacturing device 100 includes a recoater 102 configured to push powder onto a build area 138 of a build platform 104. The recoater 102 defines an advancing direction A for pushing the powder, and a returning direction R opposite the advancing direction A. The build platform 104 is mounted stationary relative to advancing and returning movement of the recoater 102 over the build platform 104. A gas inlet 128 for introducing inert gas is included on a lateral side of the build platform 104. A gas outlet 130 for suctioning inert gas from the build platform 104 is included on a lateral side of the build platform 104 opposite the inlet 128. A powder drain 132 is included at one end of the build platform 104. A second powder drain 134 is included at an end of the build platform 104 opposite the first powder drain 132. The powder drains 132, 134 are optional, and can be connected to a powder recycling system for reusing the powder deposited therein. In FIG. 1, the banks 136 and their effect on the flow arrows representing the inert gas are exaggerated for the sake of clarity.

Figure 4:
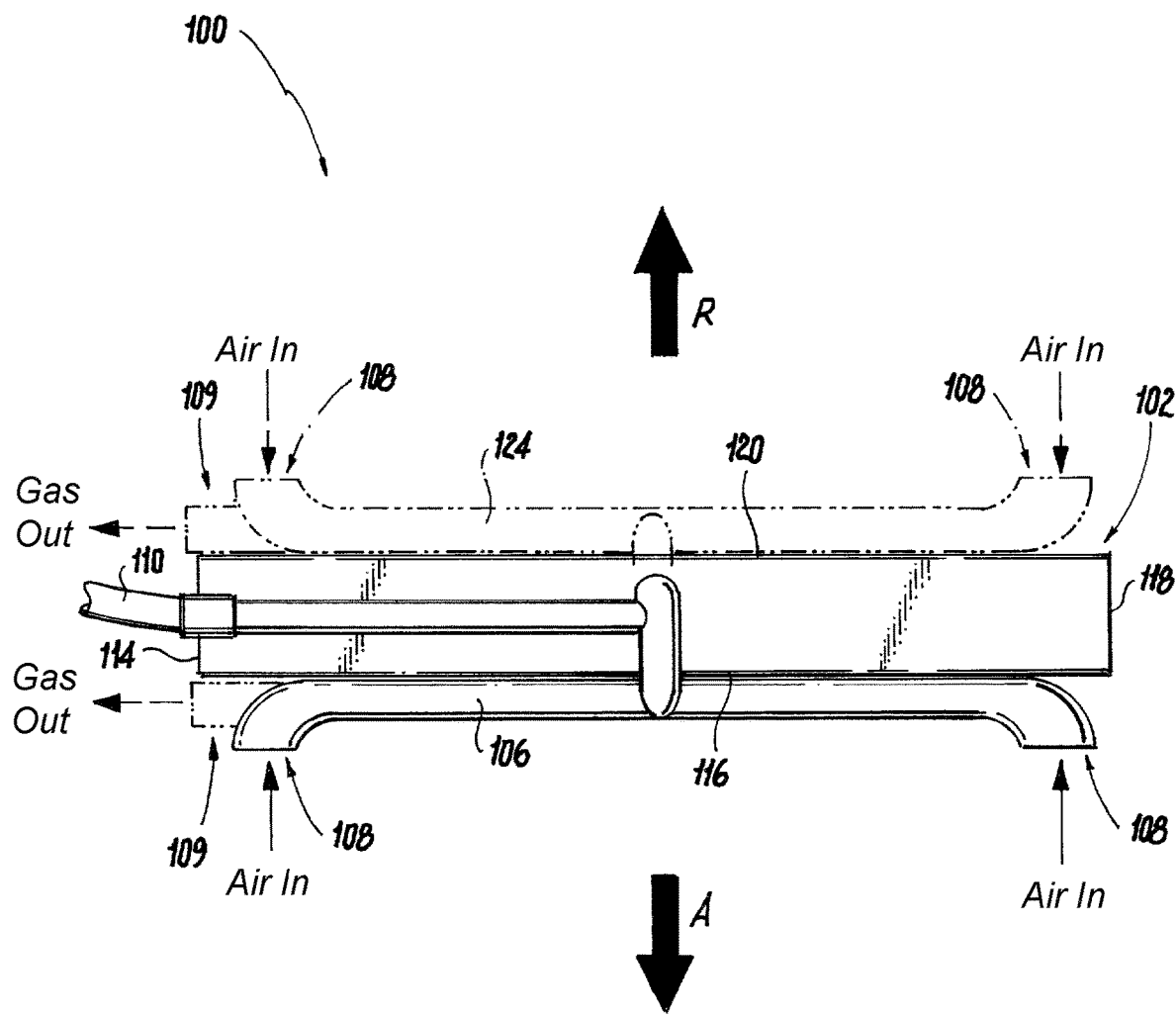
FIG. 4 is a schematic plan view of the recoater of FIG. 1, showing the gas mover.

Referring now to FIG. 4, A gas mover 106 is mounted to the recoater 102 and is configured to flow gas to remove excess powder, e.g., unfused powder and soot, from the build platform as the recoater 102 moves along the advancing direction, i.e. as the recoater moves in the advancing direction A and/or in the returning direction R. The gas mover 106 includes a vacuum with a vacuum inlet 108 mounted to the recoater 102, wherein the vacuum inlet 108 faces forward relative to the advancing direction A. A vacuum hose 110 provides a fluid connection between the vacuum inlet and a vacuum source 112.

It is also contemplated that the gas mover 106 can include a blower, e.g., instead of a vacuum, in which case the blower outlet, e.g. instead of vacuum inlet 108, can be mounted to the leading edge 116 of the recoater 102 facing forward relative to the advancing direction, and wherein the blower hose connects the blower outlet to a compressed gas source, e.g., instead of the vacuum hose 110 and vacuum source 112. The blower components are not shown in a separate drawing, as their structure is similar to the vacuum components 108, 110, 112, except the direction of gas flow is opposite. If a blower is used, it can blow excess powder from the area of potential powder banks 136 forward into the drain 132 as the recoater 102 advances in the advancing direction A. If a vacuum is used, the excess powder can instead travel into the vacuum inlet 108, and through hose 110, and optionally the excess powder can be filtered in the vacuum filter 122 and recycled for subsequent use in recoating. If a vacuum is used, the drain 132 is optional. The gas mover 106 can be turned off when the recoater 102 is not in motion.

Figure 2:
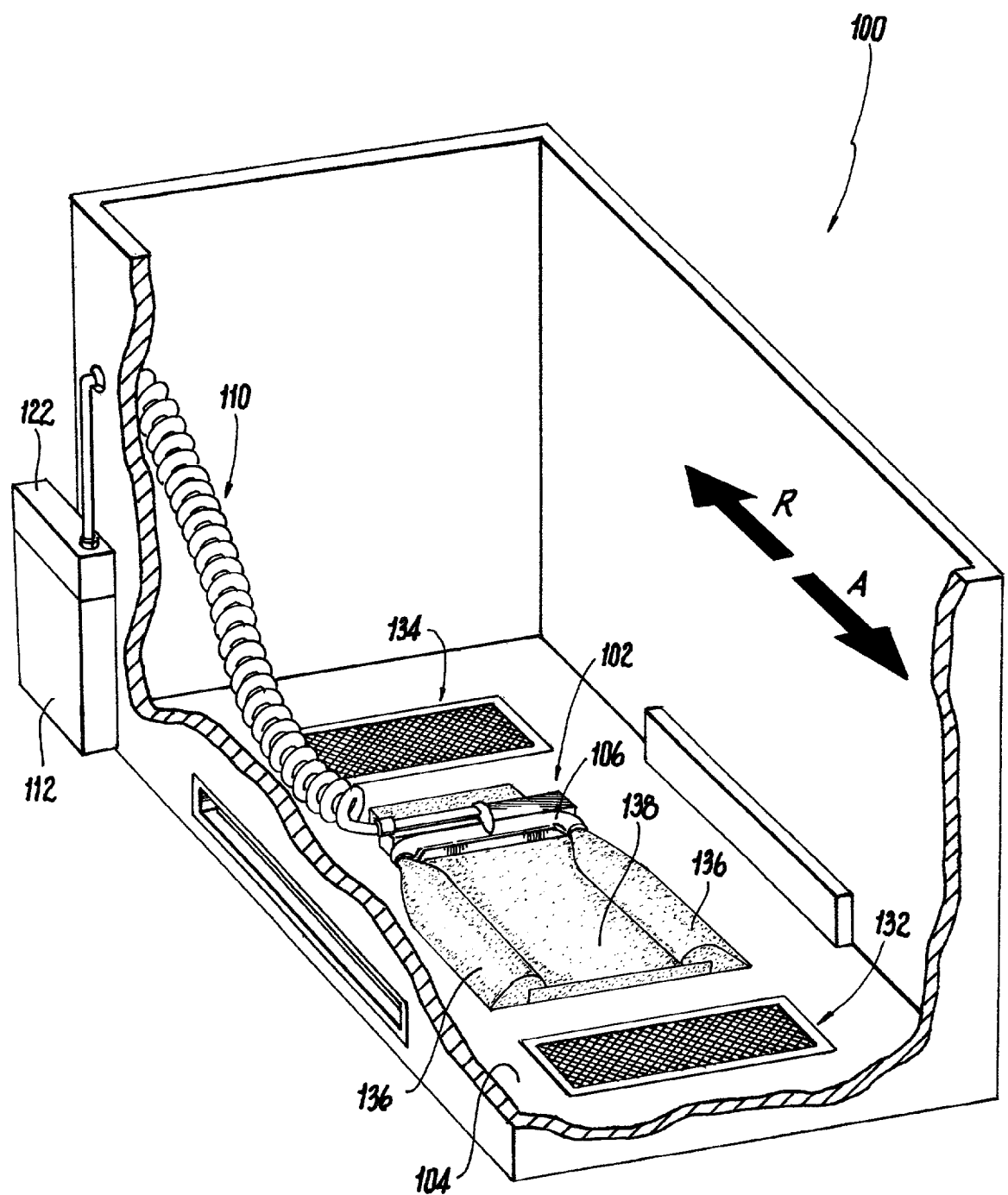
FIG. 2 is a schematic perspective view of the device of FIG. 1, showing the recoater advancing across the build area.
Figure 3:
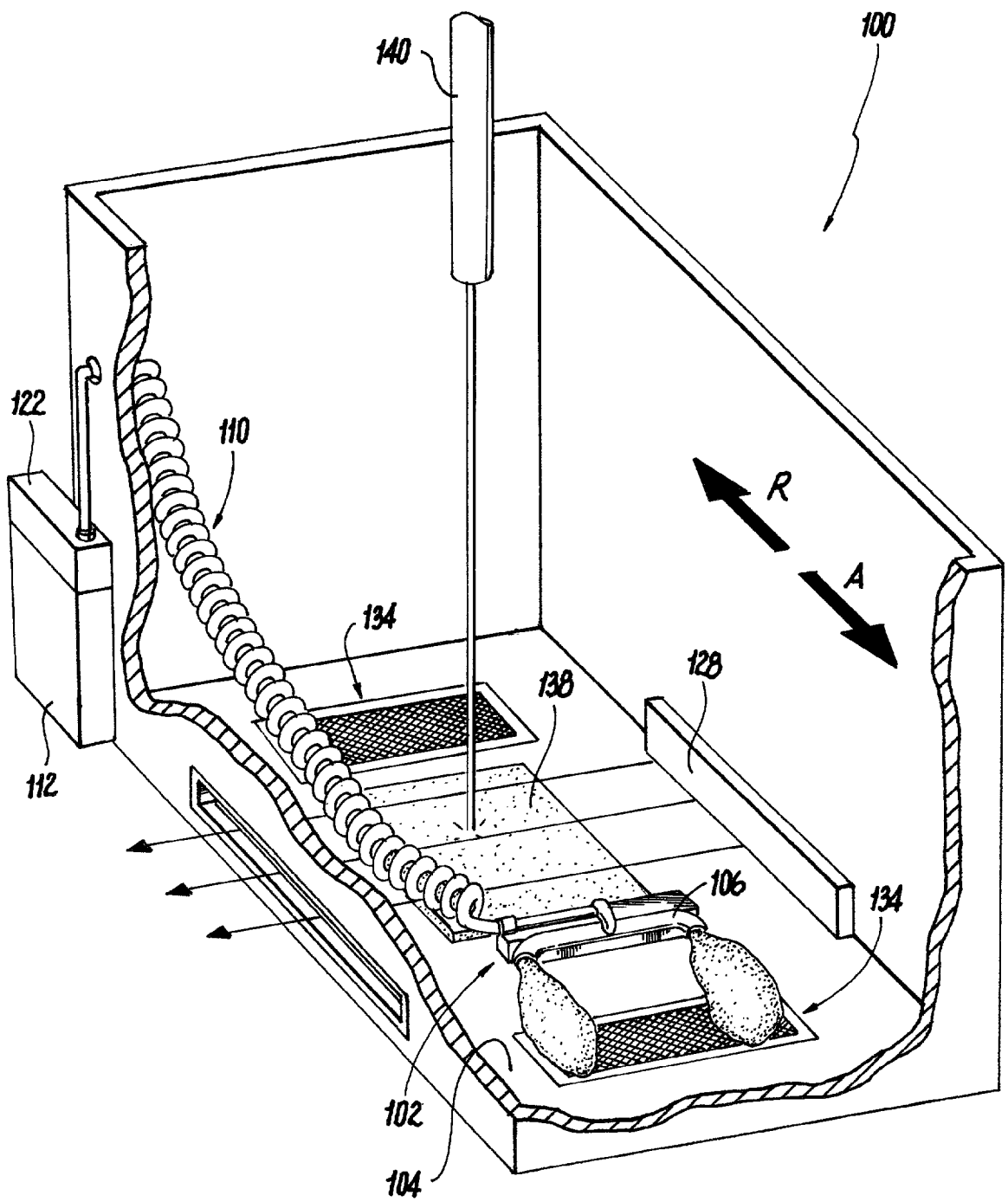
FIG. 3 is a schematic perspective view of the device of FIG. 1, showing the laser fusing powder.

With continued reference to FIG. 4, it is also possible to include a second gas mover 124, similar to the gas mover 106 described above, on the trailing edge 120 opposite the leading edge 116 of the recoater for use in removing excess powder as the recoater returns in the return direction R. The drain 134 is optional if the second gas mover 124 is a vacuum. The second, optional, gas mover 124 is shown in broken lines in FIG. 4. Both of the first and second gas movers 106 and 124 include a first inlet (or outlet in the case of a blower) 108 proximate the first lateral end 114 of the recoater 102, and a second inlet (or outlet in the case of a blower) 108 proximate the second lateral end 116 of the recoater 102 opposite the first later end 114. This outlet/inlet position for the gas movers 106, 124 facilitates removal of excess powder from the areas where powder banks 136 would otherwise build up. Those skilled in the art will readily appreciate that any other inlet configuration or location, e.g., such as blower outlets 109 pointed toward the gas outlet 130 of FIG. 1 as indicated in broken lines in FIG. 4, can be used without departing from the scope of this disclosure. Those skilled in the art will also readily appreciate that while FIG. 4 shows flow arrows labeled air in or gas out for illustrative purposes, each of the inlets/outlets 108/109 can be used as an outlet and vice versa, and also that any suitable gas besides air can be used. FIGS. 1-3 show considerable powder banks 136 for illustrative purposes only, as use of a gas mover as disclosed herein prevents the buildup of the powder banks. If a blower is used for the first gas mover 106, and vacuum is used for the second gas mover 124, the blower can remove condensates off the top of the excess powder as the recoater 102 advances, and the vacuum can vacuum any remaining excess powder, e.g. for reuse. Two separate hoses like hose 110 can be used, one for vacuum and one for pressurized gas. In such a case, the left side outlet 108 can be connected to a pressurized gas source to blow powder out the gas outlet 130, and the right side outlet 108 can be connected to the other of the two hoses and a vacuum source to vacuum powder on the right side proximate the gas inlet 128.

A method of additive manufacturing includes advancing a recoater (e.g. recoater 102) over a build area (e.g. build area 138) to push powder across the build area. The method includes moving a gas mover, using the gas mover to remove excess powder from the build area to prevent a buildup of powder banks in the build area, and selectively fusing powder in the build area, e.g., with a laser 140 as shown schematically in FIG. 3.

The method can include bathing the build area 138 in a laminar flow of inert gas, as indicated schematically by the flow arrows in FIG. 3, while selectively fusing the powder in the build area 138, e.g., with the laser 140. The method can include repeating advancing the recoater 102, selectively fusing powder, and bathing the build area 138 in a laminar flow of inert gas without building up a bank of powder along the build area 138, which would otherwise block the desirable uninterrupted, concentrated, laminar flow of inert gas over the build in progress in the build area 138. Using a gas mover can include vacuuming the excess powder with a vacuum inlet, either while advancing or returning the recoater. The method can include filtering, e.g., in vacuum filter 122 in fluid communication with the vacuum hose 110 and the vacuum source 112, and recycling the excess powder for use in the build area. It is also contemplated that using a gas mover can include blowing the excess powder toward a drain, while advancing and/or while returning the recoater.

Systems and methods as disclosed herein help ensure inert gas flow over a build stage during the melting process of additive manufacturing machines. This allows removal of condensates generated in the build process, keeps laser optics clean which is beneficial to the health of the additive manufacturing system, and enables consistent material properties throughout the parts being built.

The methods and systems of the present disclosure, as described above and shown in the drawings, provide for recoaters with superior properties including improved powder removal from in and around the build area to improve flow of inert gas during additive manufacturing. While the apparatus and methods of the subject disclosure have been shown and described with reference to illustrated exemplary embodiments, those skilled in the art will readily appreciate that changes and/or modifications may be made thereto without departing from the scope of the subject disclosure.

What is claimed is:

1. An additive manufacturing device comprising:
    a recoater configured to push powder onto a build platform, the recoater defining an advancing direction for pushing powder;

a first gas mover inlet mounted to the recoater configured to flow gas to remove powder from the build platform as the recoater moves along the advancing direction; and a second gas mover inlet, wherein the first and second gas mover inlets are proximate opposite lateral ends of the recoater for removal of excess powder from the areas where powder banks would otherwise build up, wherein there are no intervening gas mover inlets in between the first and second gas mover inlets.

2. The device as recited in claim 1, further comprising:

a build platform mounted stationary relative to advancing and returning movement of the recoater over the build platform;

a gas inlet for inert gas on a lateral side of the build platform; and a gas outlet for inert gas on a lateral side of the build platform opposite the inlet.

3. The device as recited in claim 2, further comprising:

a powder drain at one end of the build platform, for removal of power from the build platform to prevent buildup of lateral powder banks blocking flow of inert gas from the gas inlet to the gas outlet.

4. The device as recited in claim 3, wherein the powder drain is a first powder drain and further comprising:

a second powder drain at an end of the build platform opposite the first powder drain, configured remove powder from the build platform to prevent buildup of lateral powder banks blocking flow of inert gas from the gas inlet to the gas outlet.

5. The device as recited in claim 1, wherein each gas mover includes a vacuum wherein each of the first and second inlets is a vacuum inlet mounted to the recoater.

6. The device as recited in claim 5, wherein for each gas mover the vacuum inlet is mounted to the leading edge of the recoater and faces forward relative to the advancing direction.

7. The device as recited in claim 5, further comprising a vacuum hose for each gas mover fluidly connecting between the vacuum inlet and a vacuum source.

8. An additive manufacturing device comprising:

a recoater configured to push powder onto a build platform, the recoater defining an advancing direction for pushing powder;

a first gas mover outlet mounted to the recoater configured to flow gas to remove powder from the build platform as the recoater moves along the advancing direction; and a second gas mover outlet, wherein the first and second gas mover outlets are proximate opposite lateral ends of the recoater for removal of excess powder from the areas where powder banks would otherwise build up, wherein each gas mover outlet is an outlet for a blower with, wherein there are no intervening gas mover outlets in between the first and second gas mover outlets.

9. The device as recited in claim 8, wherein the blower outlet is mounted to the leading edge of the recoater and faces forward relative to the advancing direction.

10. The device as recited in claim 8, further comprising a blower hose fluidly connecting between the blower outlet and a compressed gas source.

11. The device as recited in claim 1, wherein each gas mover includes:

a vacuum in fluid communication with a vacuum inlet mounted to the recoater; and a compressed gas source in fluid communication with a blower outlet mounted to the recoater.

\* \* \* \* \*